Oct. 18, 1927.  
F. A. HUBBARD  
1,645,810  
DIRECTION FINDING AND INDICATING SYSTEM  
Filed Jan. 8, 1921   2 Sheets-Sheet 1
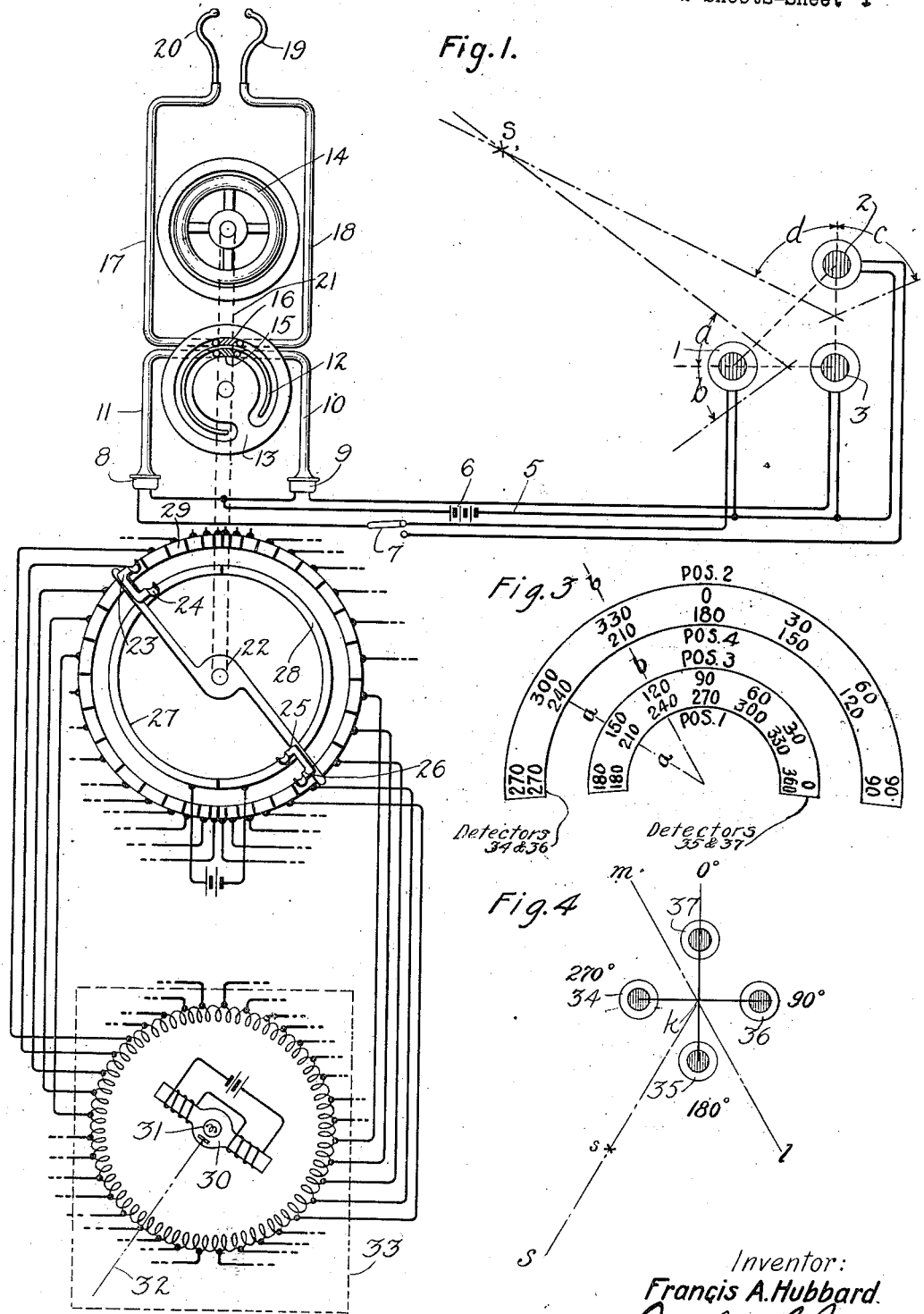
Inventor:  
Francis A. Hubbard  
by Joel C. R. Palmer  
Atty.

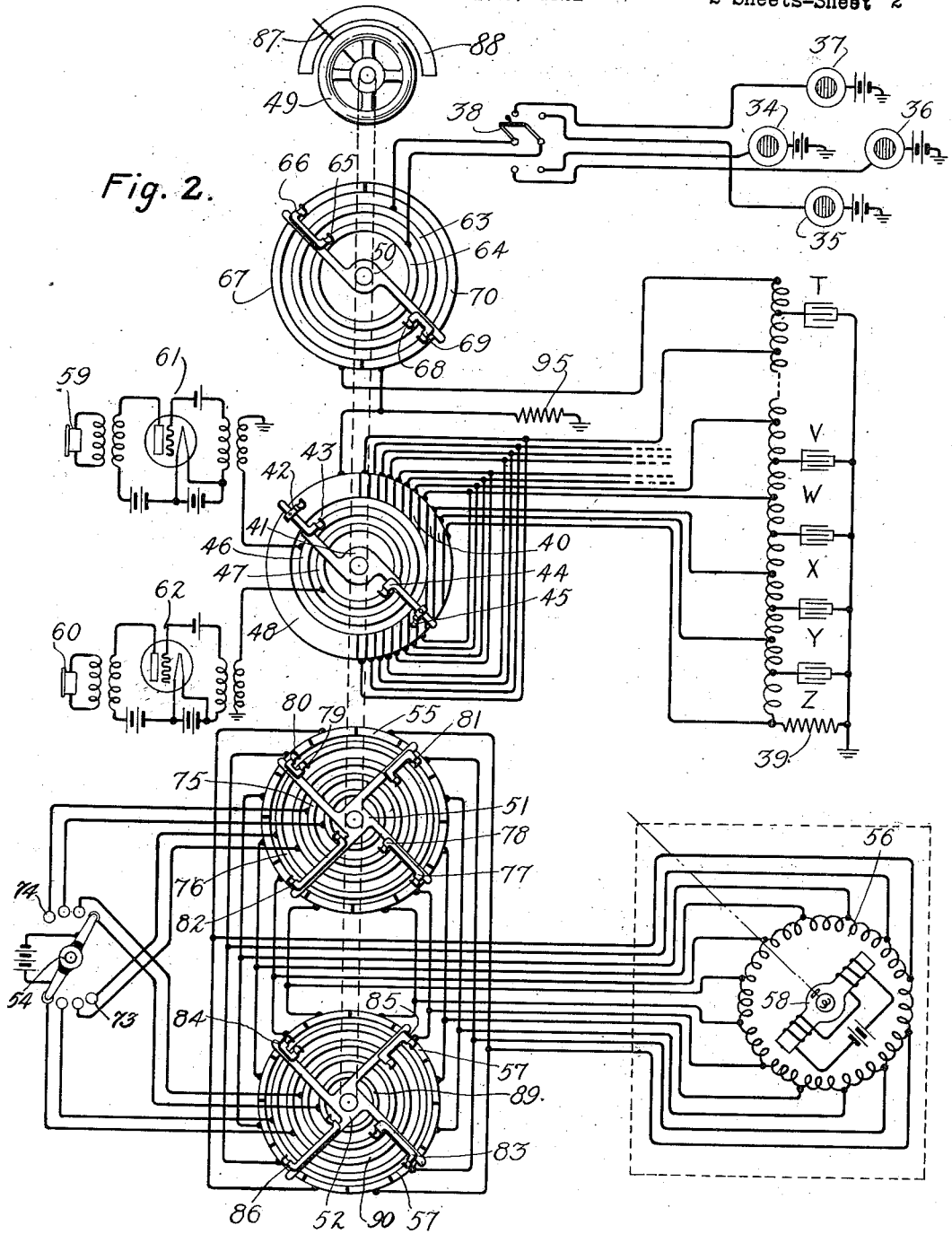

Patented Oct. 18, 1927.

1,645,810

UNITED STATES PATENT OFFICE.

FRANCIS A. HUBBARD, OF WEST ENGLEWOOD, NEW JERSEY, ASSIGNOR TO WESTERN ELECTRIC COMPANY, INCORPORATED, OF NEW YORK, N. Y., A CORPORATION OF NEW YORK.

DIRECTION FINDING AND INDICATING SYSTEM.

Application filed January 8, 1921. Serial No. 435,836.

The invention relates to a system, and apparatus for use in such system, for locating and determining the direction from an observing point of a source of vibration such as a sound source. The invention will probably find its widest application in locating the relative positions of two ships. In war time the system of the invention is particularly useful in detecting and locating enemy submarines.

It has heretofore been proposed to determine the direction of propagation of wave energy such as the sound waves set up by a ship's propeller or machinery by measuring the difference in time of arrival of a given wave front at two fixed points. In the elemental form of this method the wave front is caused to affect a pair of detectors which may be the ordinary microphones or a sound collecting tube, the response of which is separately conducted to a corresponding pair of translating devices, such as telephone receivers or stethoscope tubes which are held to the opposite ears of the observer. A compensating arrangement is provided to relatively vary the electrical length or the acoustic length of the two conducting paths so as to retard the effect of the first affected detector to bring it in phase with the effect of the later affected detector, whereby a so-called binaural balance is obtained, and the observer receives an impression of a source of sound directly in front of him or behind him. The amount of adjustment of the paths necessary for this purpose, which has been called the amount of compensation is a measure of the time interval in question and serves to fix the direction of bearing of the source. Since, when only two detectors are compared as above outlined, there are two possible conditions under which a binaural balance may be obtained, in order to resolve this ambiguity it is a common practice to use a second pair of detectors, differently oriented, and in a similar manner to compare the response of this pair. Thus in order to locate accurately the direction of a source where it is not apparent from the conditions under which the balance is obtained which is the correct one, two balances are necessary. Of course, in detecting a ship from shore, a single balance is sufficient, or in case where the general relative location of the source is otherwise obvious. However, in any case it is inconvenient to note down a scale reading for each balance, so that it has been found advantageous to provide a plotting arrangement whereby the bearing of the ship or source of sound may be determined graphically. This arrangement also permits the actual plotting of the bearing in a portion of the ship or observing station separate from the compensators.

It is obvious that in using a compensator of either the electrical or acoustic type where sections of the electrical or acoustic path are cut in and out in uniform steps by the rotation of an arm, the angular bearing is not directly proportional to the angular position of the arm but is substantially proportional to a sine function of that angle. Therefore, if motion in steps, corresponding to equal steps of the compensating path, is transmitted directly from the compensator to a plotting arrangement it is necessary that a correction be made in order to get the true bearing. It has been proposed by others to couple mechanically the arm of a circularly adjustable compensator with a plotting mechanism which connection is so arranged as to convert the angular motion thereof from a sine function of the angle to the actual angle. This arrangement however, has its limitations, including the necessity for locating the plotting board in close proximity to the compensators.

In accordance with a feature of the present invention, means is provided to control electrically a plotting arrangement from a compensator or compensators in such a manner that for any adjustment of the compensator the plotting arrangement indicates directly the true bearing of the source of sound under investigation or its image. In accordance with this feature of the invention, a circularly adjustable compensator is used and attached to the shaft thereof there is provided an arm which sweeps over a circular series of contacts, which contacts are not uniformly spaced or, what amounts to the same thing, of uniform extent, but are distributed in accordance with a trigonometric function of the angle swept over by the arm. These contacts are each connected to uniformly spaced taps on the stator of a motor, the rotor of which consists of an armature which is connected to a source of direct current. A source of direct current is also connected to the rotating arm actuated from the compensator, the effect of the rotating arm being to move the armature of the motor an equal amount each time the arm passes from one contact to the next. The armature of the motor carries an illuminator such as a small lamp and suitable reflector, arranged to project a beam of light across the plotting board. Because of the spacing or extent of the contacts on the compensator, this beam of light for any adjustment of the compensator indicates the true bearing.

The invention contemplates various other arrangements of contacts controlled by the compensator for controlling the plotting motor in the manner above indicated.

Also in accordance with the invention an arrangement is contemplated for obtaining the two binaural balances comparing different pairs of detectors in which means are provided, operated from the same compensator which is used for both balances, to distinguish between the two possible bearings for each balance and to eliminate at the plotting board the indication which is not useful. In accordance with this feature of the invention a switching arrangement is provided whereby the connections between compensator and plotting arrangement may be reversed at will so that rotation of the compensator in obtaining successive balances may be transformed into rotations in the opposite direction on a plotting board.

This and other features of the invention will more clearly appear from the following specification and the accompanying drawings in which Fig. 1 is a diagrammatic representation of one embodiment of the system of the invention utilizing a compensator of the acoustic type; Fig. 2 is a similar representation of the system embodying the invention utilizing a compensator of the electrical type, Fig. 3 shows the arrangement of the compensator scales and Fig. 4 is a diagram of a typical plot produced in the operation of the system.

In the system shown in Fig. 1 it is contemplated to use three detectors located at the apices of a triangle. These detectors are indicated diagrammatically at 1, 2 and 3. They may conveniently be in the form of microphones. One side of each of these detectors is connected to conductor 5 and a source of potential 6 and by means of the switch 7 either of the detectors 1 and 2 may be associated with a translating device such as receiver 8 and while the detector 3 is permanently connected to the receiver 9. Thus two pairs of detectors, either 1 and 3 or 2 and 3, may be associated with the receivers 8 and 9. The vibrations produced by diaphragms of the receivers 8 and 9 are, by means of sound conducting tubes 10 and 11, conducted to the adjustable sound passage 12 of an acoustic compensator. These sound passages may be cut in a disc 13 which may be rotated by the hand-wheel 14 to vary the relative lengths of the acoustic paths through the compensator as will hereafter appear. Sliding in the groove 12 are a pair of stops 15 and 16. The tubes 10 and 11 enter into the groove 12 on either side of the stop 15 and a similar pair of tubes 17 and 18 leading to the ear pieces 19 and 20 enter the passage 12 on opposite sides of stop 16. This particular construction of acoustic compensator is the invention of others and a detailed description of it is not necessary for the understanding of the present invention. The arrangement is such that by operating the hand-wheel 14 the acoustic path between the earpiece 19 and the receiver 9 and between the earpiece 20 and receiver 8 may be relatively adjusted, and when so adjusted operates as a measure of the difference in time of arrival of the particular wave front at the detectors under comparison. In compensators of this type it is common practice to place an indicator on the hand-wheel such as 14 which travels over a specially calibrated scale to indicate directly the bearing of the sound source under observation. In some instances two scales are used which may be interchangeably coupled with the hand-wheel for the purpose of obtaining both the bearing of the sound source and the bearing of its image, there being two possible balances for each pair of detectors compared. Such scales, however, require careful calibration and it is necessary to accurately note down the readings thereof, obtaining a series of balances. It is also necessary that these readings be made by the person who operates the compensator. It is, therefore, advantageous to transfer the indication or bearing as indicated by the compensator to a plotting board where the several bearings may be plotted, one form of plotting arrangement for this purpose being a large table with a ground glass top under which are arranged illuminating devices controlled from the compensators to throw a beam of light on the under side of the ground glass indicating the angular position of the compensator. A mark may be made upon the plotting table over the beam of light and another bearing or balance obtained. From several balances thus plotted on the board the bearing may be accurately determined.

However, if the angular position of the beam of light is the same as that of the compensator and the compensator is arranged to compensate in uniform or equal steps for a uniform angular rotation of the compensator, as is the case with all acoustic compensators and the majority of the practical electrical compensators of which the applicant is aware, the bearing plotted on the plotting board will not be the true bearing. It can be demonstrated mathematically and has been demonstrated practically by calibration that the amount of compensation required to obtain a balance for any particular bearing of the sound source from the given base line is proportional to the sine of the angle of bearing. In order that the beam of light on a plotting board may indicate the true bearing it is necessary to provide means for converting the sinusoidal motion or displacement proportional to the sine of a uniformly varying angle of the compensator into a uniform rotation or displacement of the indicator.

In order to accomplish this result there is secured to the shaft 21, to which is also secured the hand-wheel 14 and the adjustable disc 13, an arm 22 carrying at each of its opposite ends a pair of brushes 23, 24 and 25, 26. The brushes 24 and 25 are adapted to pass over a pair of semi-circular contacts 27 and 28 and the brushes 23 and 26 over a set of contacts such as 29. The contacts of this set, however, are not of uniform extent but vary in width in accordance with the sine law. Opposite pairs of these contacts are connected to oppositely and uniformly spaced points on the stator winding of a motor. This winding is continuous around the stator. The rotor 30 is in the form of a magnet carrying a pair of windings which are energized from a source of direct current. When the source of energy is connected to any pair of diametrically opposite taps, the resulting field of the stator is in the direction of this diameter, and the rotor moves to take up a position in this diameter. A lamp 31 or other suitable illuminating device is carried by the rotor and is arranged to project a beam of light indicated by the broken line 32 across the surface of the plotting table indicated by the dotted rectangle 33. A source of direct current is connected across the contacts 27 and 28, the effect being that, as the arm 22 is rotated, the stator winding is so energized that the resultant magnetic axis is likewise rotated resulting in the corresponding rotation of the rotor, but because of the variations in the extent of the contacts swept over by the arm 22, the angular motion of the rotor is not identically that of the arm 22, but is proportional to the sine of the angle swept over by the arm 22. It is obvious that, instead of using contacts for the arm 22 varying in extent, or width, the same result could be obtained by using contacts of uniform extent but variably spaced.

Having described the general arrangement of the apparatus in the system, its operation will now be considered. Let it be assumed for this purpose that the source of sound it is desired to detect is located at the point S shown in Fig. 1 relative to the triangular arrangement of the detectors 1, 2 and 3, and assume also that the switch 7 is in the position shown, associating detectors 1 and 3 with the compensator. The compensator will then be set so that the path between each receiver and ear piece is equal or, in other words, in the so-called zero position of the compensator. The beam of light 32 under these conditions will stand at right angles to a base line on the plotting board representing the detectors 1 and 3. The sound wave from the source S will be intercepted by the detector 1 before it is intercepted by the detector 3 and consequently, in order to obtain a balance it will be necessary to include between the receiver 8 and the earpiece 20 a sufficient length of path to compensate for the difference in time of arrival of the wave front at detector 1 and at detector 3. This is done by rotating the handwheel, which in turn rotates the brush arm 22. When the balance is obtained the beam of light will make the same angle with the base line on the plotting board as a line joining the source of sound or its image with the mid-point of such base line makes with the base line, or in other words, the angle $a$ or $b$. Therefore a line drawn over the beam of light on the plotting board may represent the source of sound or of its binaural sound image. The observer, therefore will throw the switch 7 to its other contact, restore the compensator to normal position and obtain another balance, this time comparing the response of the detectors 2 and 3. The beam of light on the plotting board will assume a position relative to a base line on the plotting board corresponding to the detectors 2 and 3 having an angle of bearing with respect to such line of either the angle $d$ or $c$. It is a comparatively simple matter therefore having two of these bearing lines on the plotting board to construct two others, each having the same angle from the base line and from an observation of which pair of the four lines thus plotted coincide, the true bearing of the source of sound may be accurately determined.

It will be observed that the method just described involves the use of a protractor or equivalent device in obtaining all possible bearing lines for each setting of the compensator. In accordance with the embodiment of the invention shown in Fig. 2, however, this is not necessary, since, as will presently appear, it is only necessary for the observer working at the plotting board to draw lines over the beam of light to get the complete solution. In this system of Fig. 2, the invention is shown as applied to a detecting arrangement embodying four detectors 34, 35, 36 and 37 which are arranged at the apices of a square and by means of the switch 38 may be associated with the compensator in pairs, that is detectors 37 and 35 are paired and detectors 34 and 36 are paired. The compensator itself is, as shown, a type of electrical compensator, which is described and claimed in my application, filed January 4, 1921, Serial No. 434,975 and is of the type in which the detectors are associated with one end of an artificial line and the receivers are variably connected to taps leading from the intermediate sections of such artificial line. The artificial line is represented as having intermediate or phase shifting sections T, V, W, X, Y and Z and a terminating section including impedance 39 which represents the surge impedance of the line. A similar impedance indicated at 95 is associated with one receiver and detector while the other receiver and detector are associated with the artificial line. Taps from the intermediate sections are associated with a series of contacts 40 which are in the nature of strips parallel to a diameter of a circle. These contacts are swept over by a rotatably adjustable arm 41 carrying brushes 42, 43, 44 and 45. The brushes 44 and 45 are electrically connected as are the brushes 42 and 43. The brushes 43 and 44 sweep over annular contacts 46 and 47 respectively, whereas the brushes 42 and 45 sweep over a semi-circular contact 48 and the contact 40. Carried on the same shaft as the brush 41 is the hand wheel 49, an indicator 87 adapted to sweep over the scale 88, a second brush carrying arm 50 and two other brush carriers 51 and 52. All of these brush carriers are moved with the hand wheel. It will be noted that by virtue of the arrangement of the contacts 40, when the brush 42 or 45 passes over them it is necessary, in order that the brush 45 or 42 may move from one contact to the next, to shift the brush arm 41 a distance which is not uniform for each section, but which follows the sine law. In other words, the projection of a point on the brush 45 and 42 on a diameter perpendicular to the direction of the extension of the contacts 40 moves along that diameter in equal steps for each section of artificial line which is cut in. Thus, in effect, the arrangement is the reverse of the arrangement described in connection with Fig. 1 and the contact arm 41 for any adjustment of the compensator represents the true bearing.

The motion of the arm 41 is transmitted to a plotting board through either of two rotary switches which have been indicated by their rotating arms 51 and 52. Which of these two and which pair of brushes of each is active is determined by the position of the rotating arm 54 of a four-position switch. Thus in the first position of arm 54, brush 77 and brush 80 are connected to the opposite poles of battery. In the second or next position in a clockwise direction, brush 81 and brush 82, in the third position brush 83 and brush 84, and in the position shown which is the fourth position brush 85 and brush 86 are connected to opposite sides of battery. The contacts of the rotary switch 51, such as contact 55 are equally spaced and are connected to equally spaced points on the winding of the motor 56. Contacts such as 57, of the switch 52 are connected to the same points of the winding of the motor 56 but in the reverse order, so that if the brushes of switch 51 are rendered effective to control the motor 56, the armature 58 of the motor rotates in one direction and if the motor is placed under the control of the brushes of switch 52, the armature rotates in the opposite direction, for the same direction of rotation of hand wheel 49.

The scale 88 as shown in detail in Fig. 3, is in effect a double scale, one scale for detectors 34 and 36 and the other scale for detectors 35 and 37. Each of these scales is provided with two sets of readings corresponding to two positions of the switch arm 54. With the detectors orientated as shown in Fig. 4, the zero position indicated on the scales is assumed to be in the direction pointing north, which is the direction of the normal to the base line joining detectors 34 and 36. With the switch arm 54 in the second position, the direction of rotation of the beam of light is the same as the direction of rotation of the compensator; hence, with the compensator in the zero position the needle will point to zero on the scale and when, rotated to the right, the needle will give an increasing reading up to 90°, whereas if it is rotated to the left, it will give a decreasing reading to 270°. Using the same pair of detectors and having the switch arm 54 set in the fourth position, the direction of rotation of the beam of light is opposite to that of the compensator, and its zero position will indicate an angle of 180°. The compensator, if rotated to the right will indicate a reading decreasing from 180° to 90°, and if rotated to the left, will indicate an angle increasing from 180° to 270°. Correspondingly, when using the detectors 35 and 37, the base line of which is displaced 90 degrees from the base line of detectors 34 and 36, a zero reading indicates an angle of 270° when the switch arm 54 is in the first position in which the direction of rotation of the beam of light and the detector are the same, while the zero reading represents an angle of 90°, when the switch arm 54 is set in position 3, where the direction of rotation of the beam of light and the compensator are opposite.

The receivers or translating devices used for determining when a balance has been obtained are indicated at 59 and 60 and are connected to the artificial line and detectors through vacuum tube amplifiers 61 and 62.

For the purpose of describing the present invention, it is sufficient to state that rotating the arm 41 through the instrumentality of the handwheel 49 serves to measure the difference in time of arrival at the two detectors of the wave front under observation, and when the handwheel has been rotated to a point where an effective binaural balance is obtained in the receivers 59 and 60, the position of the arm 41 represents the true bearing of the sound source or its image. This operation is described in detail in the copending application referred to above. It is thought that the system will be best understood from the following description of its operation in locating a source of sound.

Assume that the switch 38 is thrown in position to connect the detectors 35 and 37 with the annular contacts 64 and 63 respectively, and that the wave front reaches detector 35 before it reaches detector 37. It will be observed, therefore, that detector 35 is connected to one end of the artificial line as follows: from the switch 38, contact 64, brush 65, brush 66, contact 67 to the end section T of the artificial line. Detector 37 is connected to the impedance 95 as follows: from detector 37, switch 38, contact 63, brush 68, brush 69, impedance 95 to ground and in parallel through the input circuit of the amplifier 61 through contact 70 to contact 48, brush 42, brush 43, input coil of the amplifier 61 and through the amplifier to the receiver 59. It will be assumed that the handwheel has been rotated to the position shown and a balance obtained. Under these conditions, receiver 60 will be connected to section V of the artificial line as follows: from the section V the contact 40 upon which the brush 45 is resting, brush 44, contact 47, input coil of the amplifier 62 to the receiver 60.

Let it be assumed that for this balance the pointer 87 is in the position indicated by line a a, Fig. 3. Since this balance is obtained by using detectors 35 and 37, this reading will indicate that the bearing is at an angle of 150° or 210° which would correspond to the direction lines $k\,l$ or $k\,s$ of Fig. 4, the operator of the compensator after noting these scale readings reverses the position of switch 38, thus placing detectors 34 and 36 in the circuit to replace detectors 35 and 37. He then obtains a second balance, which we will assume is along the line b—b of Fig. 3, and the scale readings indicate that the bearing is at an angle of 210° or 330°, corresponding respectively to bearing lines $k\,s$ and $k\,m$ of Fig. 4. Since the reading of 210° is common to both settings the operator knows that this is the bearing angle and the other readings are images. He then selects the pair of detectors which gives this reading nearer the middle of the scale, in the example given, the detectors selected being detectors 34 and 36. This reading is on the lower part of the scale, which is calibrated for the fourth position of switch arm 54, and with the switch in this position the direction of rotation is opposite to the direction of rotation of the compensator arm. The operator, therefore, places the switch arm 54 in the fourth or last position and obtains an accurate balance. In moving to the position shown to obtain the balance, the handwheel also carries with it the arms of the switches 51 and 52. With the switch arm 54 in the fourth or last position, which is the position shown in the drawing, battery is connected through the brushes of the switch 54 to contacts 89 and 90 of the switch 52, thus rendering the switch 52 active to control the motor. As the arms of the switch 52 pass over the switch contacts, the battery is connected through contact 89 to brush 86 to a series of contacts 57 and thence to the corresponding taps on the stator winding of the motor 56, and from contact 90 to brush 85 to the diametrically opposite set of contacts 57, and consequently to the diametrically opposite taps of the winding of the motor 56. This will cause the beam of light on the plotting board to assume a position having the same angular relation to the base line of detectors 34 and 36, as the compensator arm bears to its normal position, and will represent one of the possible bearings of the source of sound from the two detectors being compared. Since the operator of the compensator has already resolved the ambiguity between the two settings, it will be known that the beam of light represents on the plotting board the true direction of the source of sound.

If desired as a check, a second reading may be taken using the detectors 35 and 37 and having the switch arm 54 set in the first position in which case the beam of light will move in the same angular direction as the indicator on the compensator.

In making a series of balances to determine the position of a slightly shifting source of sound, the general direction of the source will frequently be known, consequently the bearing of this source may be obtained accurately by means of one balance since it will soon become apparent which position of the switch 54 is the one which causes the plotting of the bearing of the source of sound rather than the image of the source.

It is sometimes found in calibrating a system of this kind that the effective spacing of the detector is not exactly what was anticipated, and it is desirable, therefore, to arrange the compensator so that the amount of compensation which is inserted in obtaining any given balance may be varied in accordance with the effective spacing of the detectors. The particular form of compensator switch, as disclosed in Fig. 2, in addition to being useful as a translating device to translate the amount of compensation into bearing angles is also particularly adapted to be used for the purpose of adjusting the compensator as a whole for variations in effective detector spacing. For this reason the brushes 42 and 45 are slidably adjustable along the arms of the switch 41, being adjusted outwardly for increased effective detector spacing and inwardly for decreased effective detector spacing. Because of the arrangement of the contacts such as 40 it will readily be seen that inward adjustment of the brushes 42 and 45 renders the outermost contacts such as those connected to section Z and Y ineffective and in effect lessens the number of sections of artificial line available for purposes of compensation.

What is claimed is:

1. In a direction determining system including a pair of transmission paths, a pair of detectors connected to said paths at one end and a pair of receivers associated with the opposite ends of said paths, means for varying the effective length of one of said paths relative to the other proportionately to a function of the bearing angle to be determined, an electrically driven indicator for giving the bearing angle, and a translating device between said means for varying said transmission path and said indicator, comprising a switch having a brush and segments cooperating therewith varying in length such that the number of segments passed over for given angular displacement of the brush and the angle of displacement of the brush are related to each other in the same manner as the bearing angle and said function thereof.

2. In an arrangement for measuring the angular bearing of a source of wave energy, a transmission path for said wave energy, means for evaluating a function of the angle in lengths of transmission path and means for translating said lengths into an indication of the angle, including a translating switch and an indicator electrically controlled therefrom, said switch including terminals operable in steps varying in length in accordance with said function of said angle.

3. In an arrangement for measuring the bearing angle of a source of wave energy, a transmission path for said wave energy, means for evaluating a function of the said bearing angle in lengths of transmission path and for converting said lengths into an indication of said angle including a translating switch having a movable contact arm and stationary contacts having effective contact widths varying in accordance with the sine function of a uniformly varying angle for electrically controlling an indicator.

4. In an arrangement for measuring the angular bearing of a source of wave energy, a pair of electrical transmission paths for said wave energy, a rotatable member adjustable to evaluate the sine function of the angle in terms of length of transmission path, an electrically driven indicator having a field, contacts controlled in the adjustment of the rotatable member, circuits associated with said contacts to control the rotation of the indicator in one direction and means to reverse the control of the indicator and to rotate it in the reverse direction under the control of the rotatable member comprising a switch for reversing the field of said indicator.

5. In a device for indicating bearing angles, a variable length electrical transmission path, a movable angle measuring element, means operated by said element for varying the length of said transmission path proportionately to varying functions of the angles measured by said movable element, and means operated by said element for indicating its position.

6. In a device for measuring bearing angles, means for receiving disturbances from a measured source including two electrical transmission paths one being adjustable as to length, and means for detecting and receiving said disturbances over each path, means for varying the length of said adjustable path in accordance with a measured function of said bearing angle to give a true indication of said angle, and means for translating and indicating said measured angle.

7. In an arrangement for measuring the angular bearing of a source of wave energy, a pair of electrical transmission lines for said wave energy, a plurality of circumferentially arranged contacts, the adjacent edges of said contacts lying in planes parallel with each other and connected to equally spaced points along one of said transmission lines, a circularly movable contact cooperating with said parallel contacts, means to set said circular movable contact on a contact connected with a point of said transmission line which is a measure of the sine function of the angle, and means controlled in the setting movement of said circularly movable contact to indicate the angle.

8. In an arrangement for measuring the angular bearing of a source of wave energy, a pair of electrical transmission lines for such energy, a plurality of circumferentially arranged stationary contacts the adjacent edges of said contacts lying in planes parallel with each other and connected to equal spaced points along one of said lines, a circularly adjustable contact adapted to be adjusted over said stationary contacts, a phase comparing device adapted to said line through said contacts and an indicator controlled by the adjustment of said contacts.

9. In an arrangement for determining the angular bearing of a source of wave energy, a pair of transmitting paths for said wave energy, a plurality of circumferentially arranged contacts the adjacent edges of said contacts lying in planes parallel with each other and connected to spaced points along one of said paths, a movable contact normally cooperating therewith to connect a phase indicating device to said spaced points and means for adjusting said movable contact to alter its path to exclude certain of said stationary contacts from cooperative relation therewith.

10. An arrangement for determining the angular bearing of a source of wave energy, a pair of transmitting paths for said wave energy, a plurality of circumferentially arranged contacts the adjacent edges of said contacts lying in planes parallel with each other and connected to spaced points along one of said paths arranged in the form of parallel chords of a circle, a circularly movable contact cooperating therewith, a phase indicating device associated with said movable contact and means to radially adjust said circularly movable contact to exclude certain of said other contacts from cooperative relation therewith.

In witness whereof, I hereunto subscribe my name this 6th day of January A. D., 1921.

FRANCIS A. HUBBARD.